UNITED STATES PATENT OFFICE.

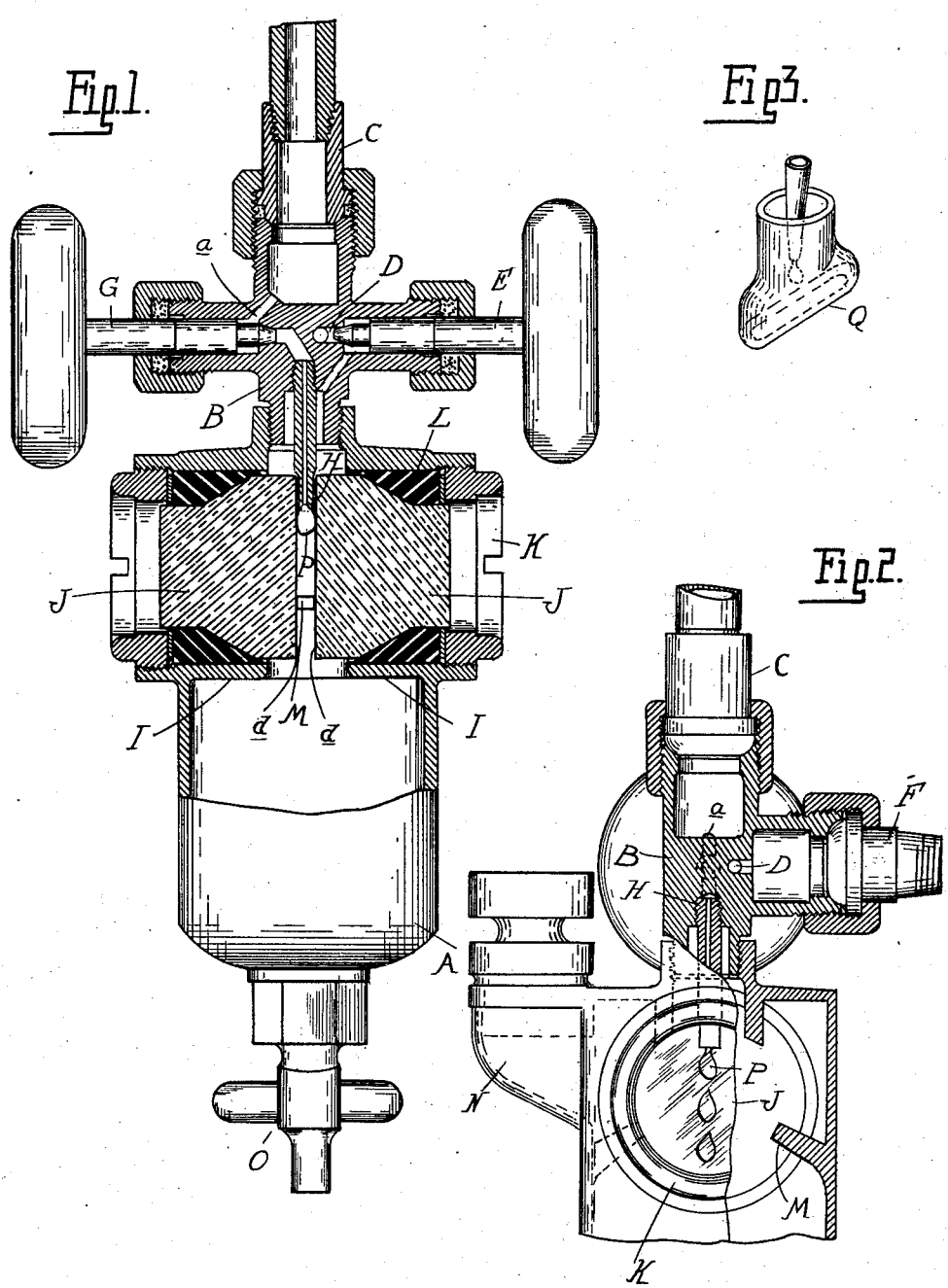

CLARENCE B. HODGES, OF DETROIT, MICHIGAN, ASSIGNOR TO DETROIT LUBRICATOR COMPANY, OF DETROIT, MICHIGAN, A CORPORATION OF MICHIGAN.

LUBRICATOR.

994,316.  Specification of Letters Patent.  Patented June 6, 1911.

Application filed November 6, 1908. Serial No. 461,349.

*To all whom it may concern:*

Be it known that I, CLARENCE B. HODGES, a citizen of the United States of America, residing at 44 Ferry avenue east, in the city of Detroit and county of Wayne, State of Michigan, have invented certain new and useful Improvements in Lubricators, of which the following is a specification, reference being had therein to the accompanying drawings.

This invention relates to new and useful improvements in lubricators, and consists particularly in the construction of a sight-feed lubricator in which the drop of water is fed through the oil.

It consists particularly in so constructing the sight-feed glasses in relation to the incoming drop of water that the water will be held against the transparent wall of the sight element and travel across the same so that it may be clearly observed.

The invention further consists in the construction and arrangement in combination of the various parts as is more fully hereinafter described and particularly pointed out in the claims.

In the drawings, Figure 1 is a vertical central section through a lubricator embodying my invention; Fig. 2 is an elevation of the lubricator shown in Fig. 1, looking at the right-hand side, partly in section; and Fig. 3 is a detached sectional perspective of a modified form of sight-feed element which may be used for carrying out my invention.

A represents the oil reservoir, in the top of which is secured a head B into which the condenser pipe C leads. Through this head is the oil exit aperture D controlled by the valve E, the oil passing out through the nipple F. The water of condensation passes through the passage $a$ controlled by the valve G and into a nozzle H which extends down a slight distance into the oil reservoir. In the construction shown there are two tubular chambers I formed in opposite walls of the reservoir, which may be properly called sight-feed chambers.

J are two sight-feed glasses held in place by nuts K bearing against the packing L. The inner ends of these sight-feed glasses bear against opposite sides of lugs M cast on and projecting from the wall of the oil reservoir.

N is the fill-opening, O the drain-cock.

The inner faces $d$ of the two sight-feed glasses J are arranged in such close proximity on opposite sides of the nozzle H that when a drop of water issues from the nozzle (the reservoir being filled with oil) it will impinge against both of these faces and travel downward in contact therewith. With the observation glasses on opposite sides there will be a spot of light observed moving from the nozzle downward when the drop of water feeds, and thus the feed is easily observable. I have indicated in Fig. 2 in dotted lines at P several of these drops as they will be observed as in use.

It is necessary in a device of this kind that there shall be room on either side of the descending drop of water for the oil to ascend—in other words, that to attempt to feed a drop of water into a tube which the drop would entirely fill would be inoperative. However, the ordinary tubular glass type of lubricator may be modified to embody my invention as by flattening the tube into substantially an oval shape, as shown at Q, Fig. 3. In this construction I have indicated the ordinary tubular glass, round at the top so as to engage the ordinary head, but flattened intermediate of its length so that the water drop in passing down would impinge against both walls thereof and yet give ample room on either side for the upward passage of the lubricant.

It is obvious that one of the glasses J may be furnished with a reflecting surface and produce somewhat similar results, although much the best result is obtained by having a transparent surface upon opposite sides of the drop of water.

I find in practice that for ordinary lubricators the space for the travel of the drop between the two walls should be from one-eighth to five-thirty seconds of an inch in width. The kind of oil used and the conditions of use might vary this somewhat. I find too, where the oil travels in contact with the two walls that a steadier more regular feed is obtained, for instance, in feeding to engine cylinders.

Having thus described my invention, what I claim as new and desire to secure by Letters Patent is:

1. In a lubricator, the combination of a cup-shaped chamber having at its top a central opening, a pair of oppositely disposed sight-feed glasses arranged above said chamber, means for holding the glasses in position on said chamber, a lug interposed between the adjacent face of the glasses to hold the same slightly spaced apart, and a nozzle positioned in the space between the glasses for the emission of the drops of water, the glasses being so arranged that the space therebetween is narrower than the diameter of the drops from the nozzle.

2. In a lubricator, the combination of a cup-shaped chamber having at its top a central opening, a pair of oppositely disposed sight feed glasses arranged above said chamber, a packing interposed between the walls surrounding the opening of the chamber and the glasses, means for holding the glasses in position on said chamber, a lug interposed between the adjacent face of the glasses to hold the same slightly spaced apart, and a nozzle positioned in the space between the glasses for the emission of the drops of water, the glasses being so arranged that the space therebetween is narrower than the diameter of the drops from the nozzle, and the said space being positioned above and in registration with the opening in the chamber, and said nozzle having a diameter slightly less than said space, whereby to afford a passage way for oil from above the glasses.

In testimony whereof I affix my signature in presence of two witnesses.

CLARENCE B. HODGES.

Witnesses:
JAMES P. BARRY,
W. J. BELKNAP.

---

Copies of this patent may be obtained for five cents each, by addressing the "Commissioner of Patents, Washington, D. C."